(12) United States Patent
Nagao

(10) Patent No.: US 12,294,616 B2
(45) Date of Patent: *May 6, 2025

(54) MOBILE DEVICE SERVICE SYSTEMS AND METHODS USING DEVICE ORIENTATION INFORMATION

(71) Applicant: Intertrust Technologies Corporation, Berkeley, CA (US)

(72) Inventor: Yutaka Nagao, Cupertino, CA (US)

(73) Assignee: Intertrust Technologies Corporation, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,971

(22) Filed: Dec. 13, 2023

(65) Prior Publication Data
US 2024/0121275 A1  Apr. 11, 2024

Related U.S. Application Data

(63) Continuation of application No. 18/049,170, filed on Oct. 24, 2022, now Pat. No. 11,882,156, which is a
(Continued)

(51) Int. Cl.
*H04L 9/40* (2022.01)
*G06F 21/44* (2013.01)
(Continued)

(52) U.S. Cl.
CPC .............. *H04L 63/20* (2013.01); *G06F 21/44* (2013.01); *H04L 63/08* (2013.01); *H04L 63/0876* (2013.01); *H04L 63/107* (2013.01); *H04L 63/1408* (2013.01); *H04W 4/023* (2013.01); *H04W 4/026* (2013.01);
(Continued)

(58) Field of Classification Search
CPC ..... H04L 63/20; H04L 63/08; H04L 63/0876; H04L 63/107; H04L 63/1408; H04L 9/3226; H04L 9/3247; H04L 9/3263; H04L 63/0823; G06F 21/44; G06F 2221/2111; H04W 4/023; H04W 4/026
See application file for complete search history.

(56) References Cited

U.S. PATENT DOCUMENTS 8,112,785 B1 * 2/2012 Cooley ................ H04W 12/37
342/450
8,200,265 B2 * 6/2012 Carlton ................ H04W 4/023
455/509

(Continued)

*Primary Examiner* — J. Brant Murphy
(74) *Attorney, Agent, or Firm* — Thayne and Davis LLC; John P. Davis

(57) ABSTRACT

This disclosure relates to, among other things, systems and methods for managing the communication of messages between devices using a service system operating as a trusted intermediary. Information indicative of device location and/or orientation may be communicated to the service system, which may use the information to determine whether a transmitting device is oriented and/or otherwise pointed in the direction of an intended receiving device. The trusted service may enforce policy articulated by the receiving device in connection with the communication of a message from the transmitting device to the intended receiving device.

20 Claims, 5 Drawing Sheets

Related U.S. Application Data continuation of application No. 17/007,449, filed on Aug. 31, 2020, now Pat. No. 11,483,352, which is a continuation of application No. 15/819,776, filed on Nov. 21, 2017, now Pat. No. 10,785,263.

(60) Provisional application No. 62/426,068, filed on Nov. 23, 2016.

(51) Int. Cl.
  *H04W 4/02* (2018.01)
  *H04L 9/32* (2006.01)

(52) U.S. Cl.
  CPC ..... *G06F 2221/2111* (2013.01); *H04L 9/3226* (2013.01); *H04L 9/3247* (2013.01); *H04L 9/3263* (2013.01); *H04L 63/0823* (2013.01)

(56) References Cited

U.S. PATENT DOCUMENTS

| | | | | |
|---|---|---|---|---|
| 8,230,075 B1* | 7/2012 | Weskamp | | H04W 4/023 715/740 |
| 8,396,489 B2* | 3/2013 | Platt | | G06Q 30/02 455/457 |
| 8,433,244 B2* | 4/2013 | Liu | | H04M 1/72457 455/414.2 |
| 8,457,654 B1* | 6/2013 | Roskind | | G01C 21/26 455/456.1 |
| 8,892,138 B2* | 11/2014 | Ekberg | | H04W 4/026 455/456.2 |
| 8,923,760 B2* | 12/2014 | Iwasaki | | H04W 4/80 715/761 |
| 9,008,696 B1* | 4/2015 | Beattie | | H04W 28/0226 340/572.1 |
| 9,513,786 B2* | 12/2016 | Thomason | | G06F 3/0484 |
| 9,584,961 B2* | 2/2017 | Scott | | H04W 4/029 |
| 9,934,389 B2* | 4/2018 | Paterra | | H04L 63/0428 |
| 2003/0217137 A1* | 11/2003 | Roese | | H04L 67/52 726/5 |
| 2010/0033299 A1* | 2/2010 | Davis | | G06F 1/1684 340/5.1 |
| 2011/0154014 A1* | 6/2011 | Thorn | | H04M 1/72412 455/67.7 |
| 2012/0110680 A1* | 5/2012 | Oliver | | H04L 63/102 726/30 |
| 2012/0233658 A1* | 9/2012 | Piersol | | G06F 21/64 726/2 |
| 2012/0249414 A1* | 10/2012 | Levien | | G06F 1/1694 715/255 |
| 2012/0324553 A1* | 12/2012 | Garcia Bernardo | | G06F 21/6209 726/5 |
| 2013/0340033 A1* | 12/2013 | Jones | | H04W 12/08 726/1 |
| 2014/0162601 A1* | 6/2014 | Kim | | H04W 8/005 455/411 |
| 2014/0195425 A1* | 7/2014 | Campos | | G06K 19/06206 705/41 |
| 2014/0282877 A1* | 9/2014 | Mahaffey | | H04W 12/33 726/3 |
| 2015/0365540 A1* | 12/2015 | Davis | | H04M 19/042 455/567 |
| 2016/0174059 A1* | 6/2016 | Morin | | G06F 3/017 455/422.1 |
| 2016/0294821 A1* | 10/2016 | Neuman | | H04L 63/0823 |
| 2016/0301450 A1* | 10/2016 | Rosenberg | | H04B 5/77 |
| 2016/0358440 A1* | 12/2016 | Trivelpiece | | G01S 11/04 |
| 2016/0359831 A1* | 12/2016 | Berlin | | H04L 63/08 |

* cited by examiner

MOBILE DEVICE SERVICE SYSTEMS AND METHODS USING DEVICE ORIENTATION INFORMATION

RELATED APPLICATIONS

This application is a continuation of U.S. patent application Ser. No. 18/049,170, filed Oct. 24, 2022, which is a continuation of Ser. No. 17/007,449, filed Aug. 31, 2020, (now U.S. Pat. No. 11,483,352), which is a continuation of U.S. patent application Ser. No. 15/819,776, filed Nov. 21, 2017 (now U.S. Pat. No. 10,785,263), which claims the benefit of priority under 35 U.S.C. § 119(e) to U.S. Provisional Patent Application No. 62/426,068, filed Nov. 23, 2016, titled "MOBILE DEVICE SERVICE SYSTEMS AND METHODS USING DEVICE ORIENTATION INFORMATION," and all of which are incorporated herein by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for the management and delivery of services to mobile devices based on location and/or orientation information associated with the devices. More specifically, but not exclusively, the present disclosure relates to delivery of services to a mobile device based on the device's location and/or orientation relative to one or more other devices.

Mobile electronic devices may include one or more systems and sensors configured to generate information relating to a location a mobile device. For example, a mobile device may include a global positioning system ("GPS") configured to generate information indicative of a location of the device. In further examples, location information may be generated using a variety of other suitable systems and/or methods such as cellular radio triangulation, IP address tracking, user-volunteered location information, and/or the like.

Mobile devices may further include one or more systems and sensors configured to generate information relating to a direction and/or an orientation of a mobile device. For example, accelerometer systems, gyroscopes, and/or the like may be used to determine the direction an associated device is oriented and/or otherwise pointed.

Systems and methods disclosed herein may use mobile device location and/or orientation information to manage the delivery of certain services to mobile devices. In some embodiments, device location and/or orientation information may be received from a plurality of devices by a service system. The received device location and/or orientation information may be used by the service system to determine a relative location and/or orientation between the devices and/or to deliver one or more services between the devices based on the determined relative location and/or orientation. For example, the service system may determine that a first device is pointed and/or otherwise oriented in the direction of a second device based on location and/or orientation information received from the devices. Services may be delivered to the first device and/or the second device based on the determination.

In further embodiments, policies may be enforced by a service system in connection with the delivery of services between devices. For example, a device receiving a message from another device via the service system may articulate one or more policies in connection with the receipt of the message. The policies may articulate, among other things, one or more requirements associated with the device that is sending the message via the trusted service system and/or a user thereof, one or more requirements associated with the message, one or more transformations and/or determinations that should be performed by the service system prior to communicating the message to the receiving device, and/or the like. In this manner, the service system may operate as a trusted intermediary in connection with the delivery of services between devices.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
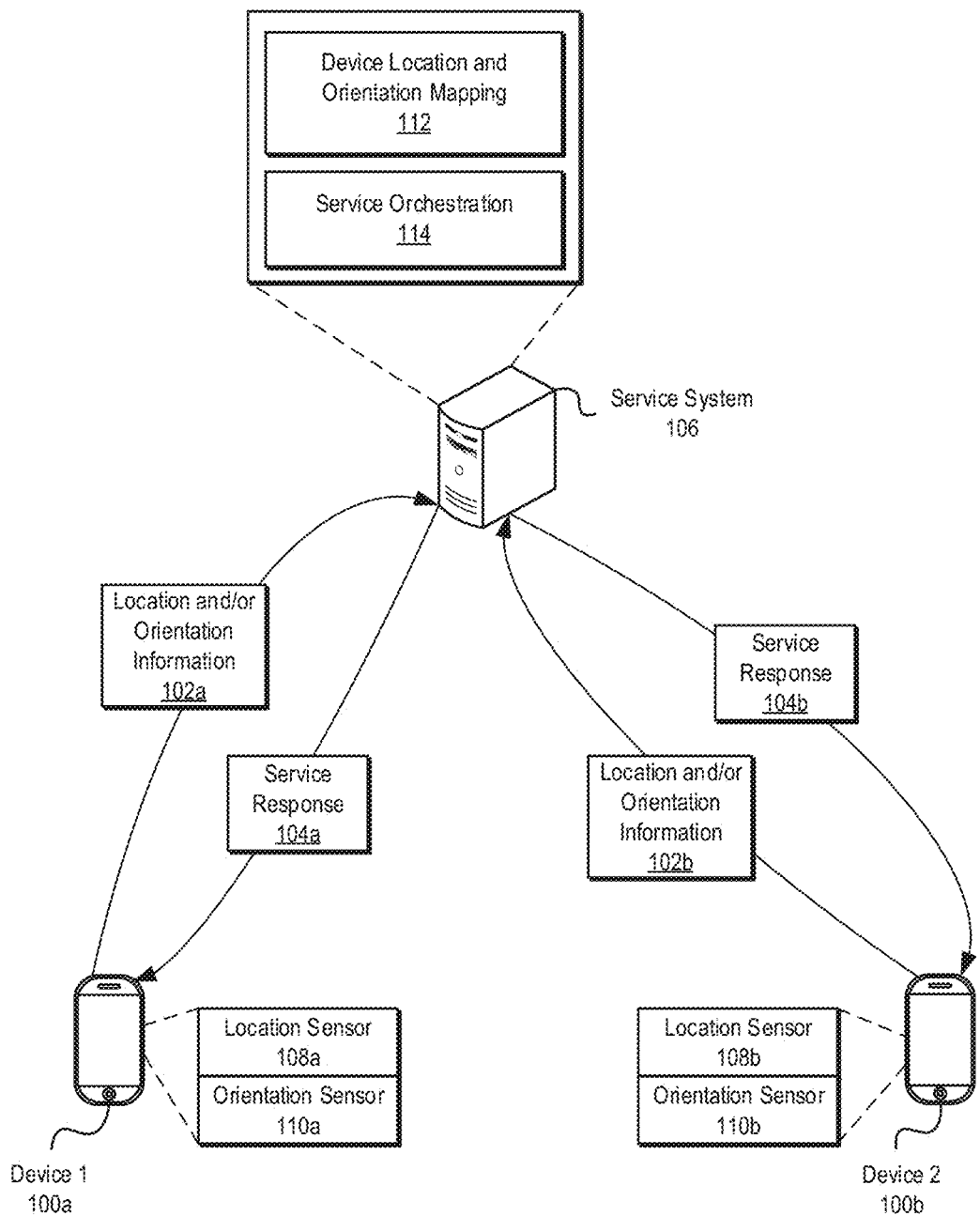
FIG. 1 illustrates delivery of services based on location and orientation information received from a plurality of mobile devices consistent with certain embodiments of the present disclosure.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numerals or descriptions. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure but is merely representative of possible embodiments of the disclosure. In addition, the steps of any method disclosed herein do not necessarily need to be executed in any specific order, or even sequentially, nor need the steps be executed only once, unless otherwise specified.

Various embodiments of the disclosed systems and methods provide for the delivery of certain services to and/or between mobile devices based, at least in part, on location and/or orientation information associated with the devices. In certain embodiments, the delivery of services to and/or between the mobile devices may be coordinated, at least in part, by a trusted service system. In some embodiments, device location and/or orientation information may be received from a plurality of mobile devices by the service system. The received device location and/or orientation information may be used by the service system to determine a relative location and/or orientation between the devices. For example, the service system may determine that a first device is pointed and/or otherwise oriented in the direction of a second device based on location and/or orientation information received from the devices.

In certain embodiments, various aspects of the disclosed systems and methods may be used to implement a message delivery service between mobile devices. In connection with such a message delivery service, a first mobile device may wish to communicate a message to a second mobile device. The first mobile device may transmit location and/or orientation information associated with the first device to a trusted service system. The first mobile device may further transmit to the service system a message intended for the second mobile device and a trusted credential associated with the first mobile device and/or a user thereof (e.g., a digital signature, a trusted certificate, and/or the like). In certain embodiments, the trusted credential may function as secure identification information identifying the first mobile device and/or its associated user.

The trusted service may further receive location and/or orientation information from a second mobile device. The second mobile device may further communicate policy information to the trusted service system relating to the delivery of services and/or messages to the second mobile device. Based on the location and/or orientation information received from the first and second mobile devices, the trusted service system may determine that the first device is pointed in the direction of the second device.

The trusted service may use the trusted credential associated with the message from the first device in connection with the policy information received from the second device to determine if the second device permits receiving the message originating from the first device and/or identify any associated policy enforcement actions that should be performed before transmitting the message to the second device (e.g., transforming the message, determining whether the message includes nefarious code, and/or the like). If allowed by the associated policy information, the message and/or a policy enforced message originating from the first device may be communicated to the second device by the trusted service. In this manner, the trusted service may act as a trusted intermediary in connection with the communication of messages between the first device and the second device.

FIG. 1 illustrates delivery of services based on location and/or orientation information received from a plurality of mobile devices 100a, 100b consistent with embodiments of the present disclosure. As discussed above, in certain embodiments, one or more mobile devices 100a, 100b may be configured to capture location and/or orientation information 102a, 102b using a variety of suitable associated sensors 108a, 108b, 110a, 110b and/or systems. For example, a mobile device 100a, 100b may comprise sensors 108a, 108b, 110a, 110b configured to generate altitude, latitude, longitude, and/or orientation information associated with the device 100a, 100b.

Generated device location and/or orientation information 102a, 102b may be transmitted to a communicatively coupled service system 106. The service system 106 may, among other things, be configured to determine a relative location and/or orientation between a plurality of mobile devices 100a, 100b and/or coordinate and/or otherwise orchestrate the delivery of services and/or messages between the devices 100a, 100b. For example, the service system 106 may determine that a first device 100a is pointed and/or otherwise oriented in the direction of a second device 100b based on location and/or orientation information 102a, 102b received from the devices 100a, 100b. Services may be delivered to the first device 100a and/or the second device 100b based on the determination.

In certain embodiments, the service system 106 may function as a trusted authority. The service system 106 may implement a variety of functions including, without limitation, device and/or user credentialing, trusted communications, authentication, authorization, key management, and/or policy management and enforcement operations. In some embodiments, the service system 106 may act as a root of trust, issuing trusted credentials to one or more mobile devices 100a, 100b and/or other systems and/or devices associated with the service system 106. Although the service system 106 illustrated as a single system, various trust and privacy management functionalities and/or other functions performed by the service system 106 may be performed by any other suitable system or combination of systems.

The various mobile devices 100a, 100b, the service system 106, and/or one or more other service providers (not shown) may comprise any suitable computing system or combination of systems configured to implement embodiments of the systems and methods disclosed herein. In certain embodiments, the mobile devices 100a, the service system 100b, and/or other service providers may comprise at least one processor system configured to execute instructions stored on an associated non-transitory computer-readable storage medium.

As discussed in more detail below, the mobile devices 100a, 100b, the service system 106, and/or other service providers may further comprise a secure processing unit ("SPU") configured to perform sensitive operations such as trusted credential and/or key management, secure policy management, and/or other aspects of the systems and methods disclosed herein. The mobile devices 100a, 100b, the service system 106, and/or other service providers may further comprise software and/or hardware configured to enable electronic communication of information between the devices and/or systems via one or more associated network connections.

The mobile devices 100a, 100b and/or the service system 106 may comprise one or more computing devices executing one or more applications configured to implement embodiments of the systems and methods disclosed herein. In certain embodiments, the mobile devices 100a, 100b may comprise at least one of a smartphone, a smartwatch, a laptop computer system, a desktop computer system, a wearable personal electronic device, a tablet computer, and/or any other computing system and/or mobile device that may be used in connection with the disclosed systems and methods.

In certain embodiments, the mobile devices 100a, 100b may further comprise software and/or hardware (e.g., sensors) configured to, among other things, measure and/or otherwise obtain location and/or orientation information 102a, 102b relating to a location of a device 100a, 100b, and may include any of the types of sensor systems 108a, 108b, 110a, 110b disclosed herein. For example, the mobile devices 100a, 100b may comprise one or more location sensors 108a, 108b such as, for example, a GPS sensor configured to generate information indicative of a location of an associated device 100a, 100b (e.g., altitude, latitude, longitude, and/or the like). In further embodiments, the location sensors 108a, 108b may comprise one or more systems that may not directly provide location information associated with the location of an associated device 100a, 100b, but may comprise systems that generate and/or otherwise receive information that may be used to determine and/or otherwise estimate device location such as, for example, cellular radio triangulation information, IP address information, user-volunteered location information, and/or the like.

The mobile devices 100a, 100b may further comprise one or more orientation sensors 110a, 110b. The orientation sensors 110a, 110b may be configured to generate information relating to a direction and/or an orientation of an associated mobile device 100a, 100b. In some embodiments, the orientation sensors 110a, 110b may comprise one or more accelerometer systems, gyroscopes, digital compasses, and/or any other sensor that may provide information that may be used to determine the direction an associated device 100a, 100b is orientated and/or otherwise pointed. It will be appreciated that a wide variety of types of sensors 108a, 108b, 110a, 110b may be used to generate and/or otherwise determine device location and/or orientation 102a, 102b, and that any suitable type of sensor and/or system may be used in connection with various aspects of the disclosed embodiments.

The mobile devices 100a, 100b, the service system 106, and/or one or more other service providers may communicate using a network comprising any suitable number of networks and/or network connections. The network connections may comprise a variety of network communication devices and/or channels and may use any suitable communication protocols and/or standards facilitating communication between the connected devices and systems. For example, in some embodiments the network may comprise the Internet, a local area network, a virtual private network, and/or any other communication network utilizing one or more electronic communication technologies and/or standards (e.g., Ethernet and/or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may use IEEE's 802.11 standards, Bluetooth®, ultra-wide band ("UWB"), Zigbee®, and or any other suitable communication protocol(s).

Location and/or orientation information 102a, 102b may be communicated from the mobile devices 100a, 100b to the service system 106. Based on the received location and/or orientation information 102a, 102b, a device location and/or orientation mapping engine 112 executing on the service system 106 may determine a relative location and/or orientation between the associated devices 100a, 100b. For example, the device location and/or orientation mapping engine 112 may determine that a first device 100a is pointed and/or otherwise oriented in the direction of a second device 100b based on location and/or orientation information 102a, 102b associated with the devices 100a, 100b.

In certain embodiments, to determine whether a device 100a, 100b is pointed in the direction and/or otherwise oriented towards another device 100a, 100b, information relating an orientation from only one of the devices may be used by the device location and/or orientation mapping engine 112 (e.g., a device transmitting a message and/or the like). For example, location information 102a may be received from a first device 100a that may identify and/or used to identify a location of the first device 100a (e.g., a latitude, longitude, and/or altitude, a location in an x-y-z coordinate space, etc.). Both location and orientation information 102b, however, may be received from a second device 100b that may identify and/or be used to identify a location of the second device 100b (e.g., e.g., a latitude, longitude, and/or altitude, a location in an x-y-z coordinate space, etc.) and a direction in which the device 100b is pointed and/or otherwise oriented. Using the location and orientation information 102b received from the second device 100b, the device location and/or orientation mapping engine 112 may determine whether the second device 100b is pointed in a direction of a location associated with the first device 100a identified based on location information 102a received from the first device 100a.

Consistent with various disclosed embodiments, the service system 106 may deliver a service response 104a, 104b to one or more of the mobile devices 100a, 100b based on the determined relative position and/or orientation of the devices 100a, 100b. For example, in response to determining that the first device 100a is pointed in the direction of the second device 100b, the service system 106 may deliver an electronic message generated by the first device 100a to the second device 100b. In certain embodiments, the delivery of service responses 104a, 104b to the one or more mobile devices 100a, 100b may be coordinated, at least in part, by a service orchestration module 114 executed by the service system 106.

As described in detail below, in some embodiments, the service system 106 may act as a trusted intermediary in connection with such an exchange of messages between devices 100a, 100b. In other embodiments, other information may be exchanged between the devices 100a, 100b and/or the service system 106 based on the determined relative positions/orientations of the devices 100a, 100b including, for example, contact information, information associated with an electronic game (e.g., an electronic tag game and/or the like), executable code, and/or any other type of desired information.

It will be appreciated that a number of variations can be made to the architecture, relationships, and examples presented in connection with FIG. 1 within the scope of the inventive body of work. For example, certain device and/or system functionalities described above may be integrated into a single device and/or system and/or any suitable combination of devices and/or systems in any suitable configuration. Thus it will be appreciated that the architecture, relationships, and examples presented in connection with FIG. 1 are provided for purposes of illustration and explanation, and not limitation.

Figure 2:
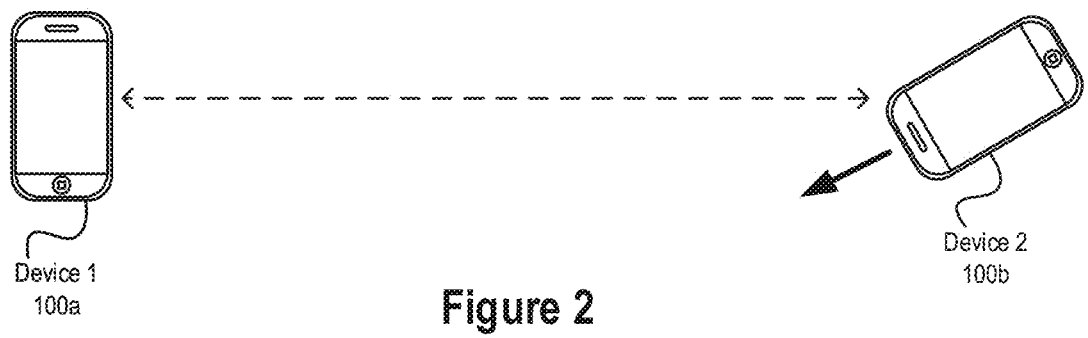
FIG. 2 illustrates an example of determining a relative location and orientation between mobile devices consistent with certain embodiments of the present disclosure.

FIG. 2 illustrates an example of determining a relative location and orientation between mobile devices 100a, 100b consistent with embodiments of the present disclosure. A service system (not shown) may receive location and/or orientation information from a first device 100a and a second device 100b. A location of the first device 100a may be identified by the service system based on available location information communicated to the service system by the first device 100a. The location may be compared with the location of the second device 100b identified by the service system based on available location information communicated to the service system by the second device 100b.

Orientation information associated with the second device 100b may indicate the second device 100b is not pointed in the direction of the location of the first device 100a. Accordingly, the service system may determine that the second device 100b is not oriented towards the location of the first device 100a, and may or may not deliver a service response to the first device 100a and/or the second device 100b based at least in part on the determination.

Figure 3:
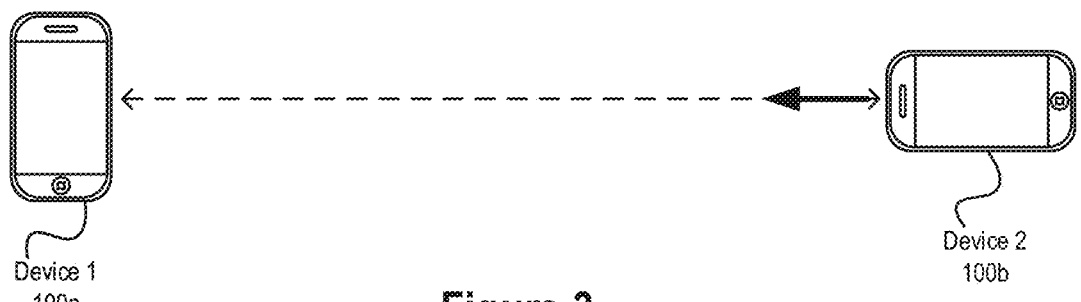
FIG. 3 illustrates another example of determining a relative location and orientation between mobile devices consistent with certain embodiments of the present disclosure.

FIG. 3 illustrates another example of determining a relative location and orientation between mobile devices 100a, 100b consistent with embodiments of the present disclosure. A service system (not shown) may receive location and/or orientation information from the first device 100a and the second device 100b. Based on the received location and/or orientation information, the service system may determine that the second device 100b is oriented towards the location associated with the first device 100a. Based on this determination, the service system may or may not deliver a service response to the first device 100a and/or the second device 100b. For example, in some embodiments, a message communicated from the second device 100b to the service system may be delivered to the first device 100a based on the determination that the second device 100b is oriented towards and/or otherwise pointed in the direction of the location of the first device 100a.

In some embodiments, determining whether a device 100a, 100b is oriented and/or otherwise pointed towards another device 100a, 100b based on relative device location and/or orientation information may depend on a variety of variables. For example, in some embodiments, determining whether a device 100a, 100b is oriented towards another device 100a, 100b may depend on the determined orientation being within a certain area, a certain accuracy and/or precision window, and/or a certain margin of error of the location of the other device 100a, 100b. In some embodiments, this area, accuracy and/or precision window, and/or margin of error may depend on certain available situational information. For example, if a device 100a, 100b is located in a relatively crowded room with a number of other devices 100a, 100b, the area, window, and/or margin of error may be relatively smaller, thereby requiring more precise orientation of a device 100a, 100b towards another device 100a, 100b. Similarly, if a device 100a, 100b is located at a further distance from another device 100a, 100b, the area, window, and/or margin of error may be relatively larger, requiring less precise orientation of a device 100a, 100b towards another device 100a, 100b than would be required if the devices 100a, 100b were closer together.

In further embodiments, an area, accuracy and/or precision window, and/or margin of error used to determine whether a device is oriented towards another device 100a, 100b may depend on a particular application. For example, an electronic tag game may use a relatively smaller area, accuracy and/or precision window, and/or margin of error for advanced players than that used for more novice players.

Figure 4:
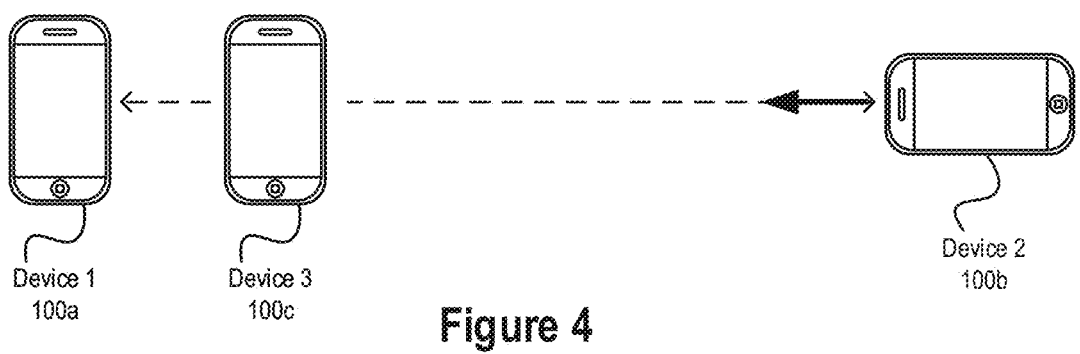
FIG. 4 illustrates a further example of determining a relative location and orientation between mobile devices consistent with certain embodiments of the present disclosure.

FIG. 4 illustrates a further example of determining a relative location and orientation between mobile devices 100a-100c consistent with embodiments of the present disclosure. A service system (not shown) may receive location and/or orientation information from a first device 100a, a second device 100b, and a third device 100c. Based on the received location and/or orientation information, the service system may determine that the second device 100b is oriented towards locations associated with the first device 100a and the third device 100c and deliver or not deliver a service response to the first, second, and/or third devices 100a-100c based on the determination. For example, in some embodiments, a message may be communicated from the second device 100b to both the first and third devices 100a, 100c based on the determining that the second device 100b is oriented towards the locations of the first and third devices 100a, 100c.

In further embodiments, a message may be communicated from the second device 100b to the third device 100c (e.g., communicated via a service system acting as a trusted intermediary) based on determining that the second device 100b is oriented towards the location of the first and third devices 100a, 100c and determining that the third device 100c is located closer to the second device 100b than the first device 100b. Similarly, in some embodiments, a message may be communicated from the second device 100b to the first device 100a (e.g., communicated via a service system acting as a trusted intermediary) based on the determining that the second device 100b is oriented towards the location of the first and third devices 100a, 100c and determining that the first device 100a is located farther from the second device 100b than the third device 100c. In yet further embodiments, a user of the second device 100b may be presented with an indication that the second device 100b is oriented in the direction of both the first and third devices 100a, 100c, and the user may select which of the devices 100a, 100c they would like to select to transmit a message to and/or the like.

In one example implementing certain embodiments of the disclosed systems and methods, a service system may implement a trusted electronic message delivery service. In at least one example, a first individual may identify a second individual in a public setting that they may wish to meet and initiate a conversation. The first individual may compose a greeting message on their mobile device in a messaging application and may point their device in the direction of the second individual. The second individual may receive the greeting message if their device also has the messaging application installed and has agreed to accept messages from other individuals and/or certain approved individuals within their social network. Upon receipt of the message (e.g., receipt of the message from the service system acting as a trusted intermediary), the second individual may choose to respond or connect in person with the first individual that sent the greeting.

In another example, a first individual may identify a second individual that they recognize, but may not recall any specific details regarding the second individual. The first individual may point their device in the direction of the second individual and initiate a request to a service system for information regarding the second individual via an associated application. If the second individual also has the application on their device and has consented to sharing contact and/or other profile information, the service system may determine that the first individual's device is pointed in the direction of the second individual's device and, in response, provide contact and/or other profile information relating to the second individual to the first individual (e.g., social media profile information and/or the like).

Figure 5:
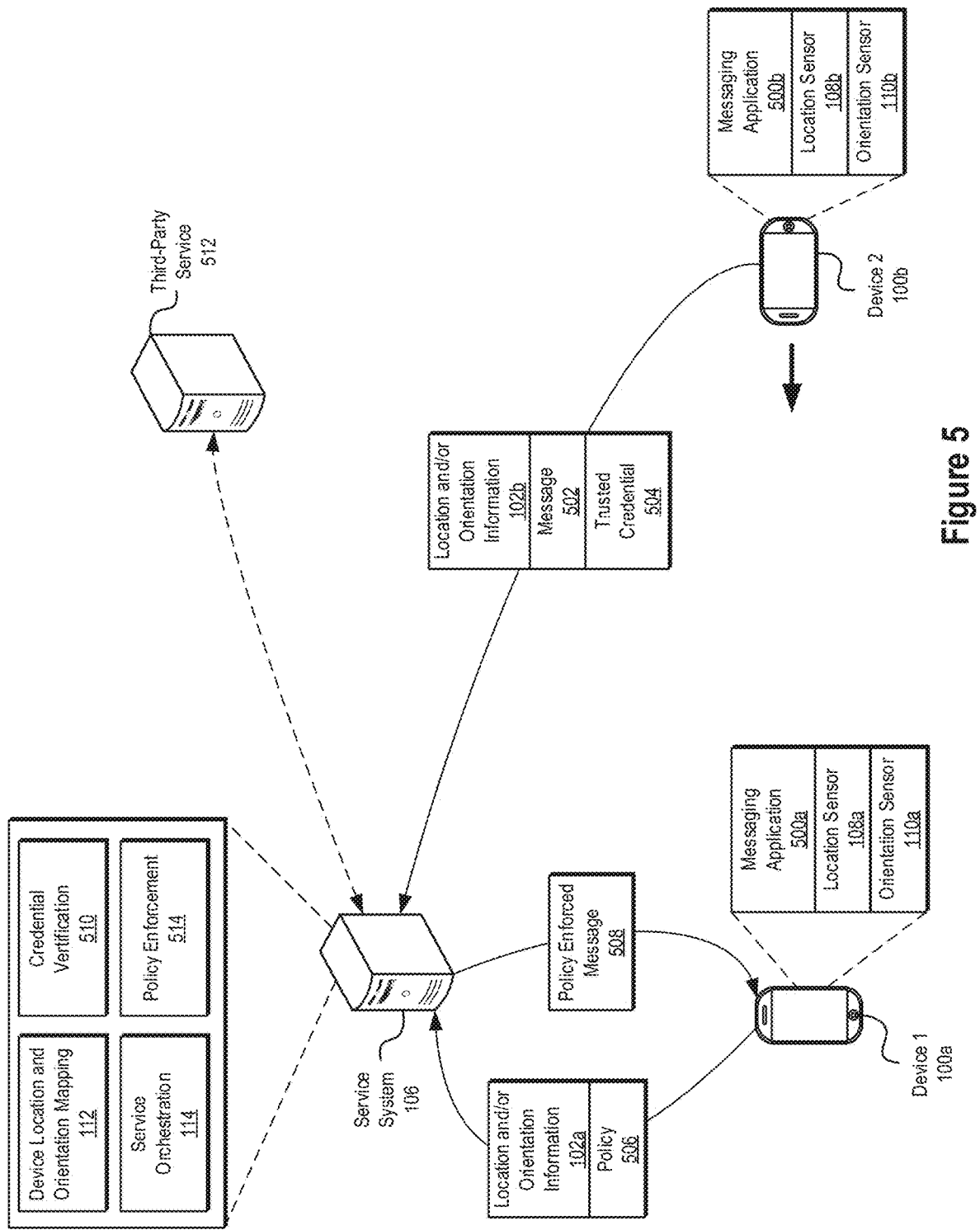
FIG. 5 illustrates an example of message delivery between devices using a trusted service system based on received device location and orientation information consistent with certain embodiments of the present disclosure.

FIG. 5 illustrates an example of message delivery between devices 100a, 100b using a trusted service system 106 based on received device location and/or orientation information 102a, 102b consistent with certain embodiments of the present disclosure. In certain embodiments, the service system 106 may operate as a trusted intermediary in connection with the exchange of messages and/or other information between devices 100a, 100b. In various embodiments, the service system 106 may be configured to enforce one or more policies articulated by and/or otherwise associated with the devices 100a, 100b in connection with orchestrating the delivery of messages and/or other information between the devices 100a, 100b.

A user of a second device 100b may be interested in sending a message to a first device 100a. In certain circumstances, a user of the first device 100a may be aware that the user of the second device 100b is interested in sending the message. In other circumstances, however, the user of the first device 100a may not necessarily be aware that the user of the second device 100b is interested in sending the message. Although various embodiments are described herein in connection with the communication of a message between devices, it will be appreciated various embodiments disclosed herein may be used in connection with the communication of a variety of other types of information.

A user of the second device 100b may interact with the device 100b using a message application 500b executing on the device 100b. Using the application 500b, the user may direct the second device 100b to transmit a message 502 to the service system 106 which may operate as a trusted intermediary in connection with the communication of the message 502 between the second device 100b and the first device 100a. In some embodiments, the user of the second device 100b may use the application 500b to indicate their desire to communicate the message 502 to the first device 100a and/or a user thereof, which may result in the second device 100b transmitting the message 502 to the service system 106.

The second device 100b may further transmit location and/or orientation information 102b relating to a location and/or orientation of the second device 100b to the service system 106. For example, one or more location sensors 108b and/or orientation sensors 110b of the second device 100b may generate altitude, latitude, longitude, and/or orientation information associated with the device 100b, which may be communicated to the service system 106 as location and/or orientation information 102b. In some embodiments, location and/or orientation information 102b may be generated and/or transmitted to the service system 106 in response to the user of the second device 100b directing the second device 100b to communicate the message 502 to the service system 106 and/or first device 100a. In further embodiments, the location and/or orientation information 102b associated with the second device 100b may be continuously and/or periodically communicated to the service system 106, thereby allowing the service system 106 to determine a current and/or estimated location and/or orientation of the second device 100b at a given time.

In connection with transmitting the message 502 to the service system 106, the second device 100b may additionally transmit a trusted credential 504 associated with the second device 100b, a user of the second device 100b, and/or the message 502. In some embodiments, the trusted credential 504 may be issued by a trusted authority operating as a root of trust. In certain embodiments, the trusted service system 106 may function as a trusted authority configured to issue trusted credentials 504. In further embodiments, one or more separate trusted authorities may issue trusted credentials 504 in lieu of and/or in addition to the service system 106. For example, in some embodiments, a first trusted authority may issue the second device 100b a first trusted credential associated with the device 100b, a second trusted authority may issue the second device 100b a second trusted credential uniquely identifying a user of the device 100b, and a third trusted authority may issue the second device 100b a third trusted credential associated with the message 502.

A variety of types of trusted credentials 504 may be used in connection with the disclosed embodiments. The trusted credential 504 may include, without limitation, one or more of a digital certificate, a digital signature, a cryptographic key, and/or any other information that may securely authenticate and/or otherwise be associated with a message 502, a device 100b, and/or a user of the same and/or operate as an indicia of trust of some attribute. In certain embodiments, the trusted credential may be generated using any suitable cryptographic techniques (e.g., techniques that utilize cryptographic hash algorithms). It will be appreciated that there are a variety of suitable trusted credential and techniques for generating a credential, and that for purposes of practicing the systems and methods disclosed herein, any suitable credential and/or technique and/may be used.

In some embodiments, possession of a trusted credential 504 may provide an trusted indication relating to one or more characteristics and/or attributes of the device 100b, a user of the device 100b, the application 500b executing on the device, the message 502, and/or the like. For example, a trusted credential 504 may uniquely identify the device 100b and/or a user thereof. The trusted credential 504 may further certify one or more software and/or hardware characteristics of the device 100b (e.g., secure software and/or hardware characteristics and/or capabilities). In some embodiments, the trusted credential 504 may certify an attribute of a user of the device 100b such as, for example, membership in one or more groups and/or the like.

In further embodiments, the trusted credential 504 may certify one or more characteristics relating to the message 502. For example, if the message 502 comprises executable code, the trusted credential 504 may be issued to the second device 100b after certification by a trusted authority and/or a trusted application executing on the device 100b that the message 502 does not include harmful and/or otherwise nefarious code, that the code associated with message 502 only accesses certain information and/or interfaces on an executing device, that the code associated with the message 502 meets one or more articulated security requirements, and/or the like.

The first device 100a may transmit location and/or orientation information 102a relating to a location and/or orientation of the first device 100a to the service system 106. For example, one or more location sensors 108a and/or orientation sensors 110a of the second device 100a may generate altitude, latitude, longitude, and/or orientation information associated with the first device 100a, which may be communicated to the service system 106 as location and/or orientation information 102a. In some embodiments, the first device 100a may only transmit information relating to a location of the device 100a as part of the location and/or orientation information transmitted to the service system 106, as orientation information associated with the first device 100a may not necessarily be used in connection with determining whether the transmitting second device 100b is oriented towards the first device 100a.

In some embodiments, location and/or orientation information 102a may be generated and/or transmitted to the service system 106 in response to the user of the first device 100a directing the first device 100a to communicate the information 102a via a messaging application 500a executing on the first device 100a. For example, in some embodiments, a user of the first device 100a may set the device 100a in a receiving mode (e.g., a mode allowing the first device 100a to receive messages and/or other information from other devices) using the messaging application 500a and/or another device setting application, which may result in the first device 100a transmitting associated location and/or orientation information 102a to the service system 106. In certain embodiments, the location and/or orientation information 102a associated with the first device 100a may be continuously and/or periodically communicated to the service system 106, thereby allowing the service system 106 to determine a current and/or estimated location and/or orientation of the first device 100a at a given time.

The first device 100a may further transmit policy information 506 to the service system 106, which may be enforced by a policy enforcement module 514 executing on the service system 106. In certain embodiments, the policy information 506 may be defined and/or otherwise articulated by a user of the first device 100a using the messaging application 500a and/or another device setting application executing on the first device 100a. Policy information 506 may be transmitted to the service system 106 concurrent with location and/or orientation information 102a. In further embodiments, policy information may be transmitted to the service system 106 separate from the location and/or orientation information 102a.

The policy information 506 may articulate a variety of restrictions, conditions, requirements, and/or other actions associated with the communication of messages and/or other information to the first device 100a by the service system 106 and/or one or more other devices (e.g., the second device 100b). In certain embodiments, policy information 506 may articulate one or more restrictions, conditions, and/or requirements that relate to an identity of a device that wishes to communicate messages to the first device 100a (e.g., the second device 100b) and/or a user thereof. For example, the policy information 506 may articulate that only certain authorized individuals and/or devices may communicate messages to the first device 100a via the service system 106 (e.g., individuals within a user's contact list, a certain degree of connectedness on a social networking service, members of a group and/or organization, and/or the like). Similarly, the policy information 506 may articulate that certain individuals and/or devices are restricted from communicating messages to the first device 100a via the service system 106.

In certain embodiments, the policy information 506 may articulate one or more restrictions, conditions, and/or requirements that relate to the software and/or hardware characteristics of a device that wishes to communicate messages to the first device 100a (e.g., the second device 100b). For example, a user of the first device 100a may specify in policy information 506 that they only wish to receive messages originating from devices meeting certain minimum software and/or hardware security requirements.

In further embodiments, the policy information 506 may articulate one or more restrictions, conditions, and/or requirements that relate to the contents of received messages. For example, the policy information 506 may require that the message contents be examined and/or otherwise certified to confirm that they do not include harmful and/or otherwise nefarious code, code that access certain secure information and/or interfaces, code that does not meet one or more articulated security requirements, and/or the like.

In various embodiments, the policy information 506 may further specify that one or more operations and/or transformations should be performed on a message by the service system 106 and/or another system prior to communicating the message to the first device 100a. For example, policy information 506 may articulate that the service system 106 should remove and/or add certain information from a message prior to communicating the message to the first device 100a.

In some embodiments, policy information 506 may articulate one or more conditions and/or requirements relating to demonstrating that a user, a device transmitting a message, and/or a message itself possess and/or otherwise is associated with a trusted credential 504 prior to allowing the message to be received by the first device 100a. For example, policy information 506 may require that a user and/or device transmitting a message possesses a credential issued by a trusted authority attesting to an authenticated identity and/or characteristic of the user and/or device. In further embodiments, a policy may require that a message be electronically signed and/or associated with a credential issued by a trusted authority authenticating that the message does not comprise nefarious code and/or meets certain requirements.

It will be appreciated that a variety of other types of policies may be included as part of policy information 506 provided to the service system 106, and that any type of policy articulating any restrictions, conditions, requirements, and/or actions to be enforced in connection with the communication of messages and/or other information to a device (e.g., the first device 100a) may be utilized in connection with the disclosed embodiments.

Based on the location and/or orientation information 102b received from the second device 100b and the location and/or orientation information 102a received from the first device 100a, a device location and/or orientation mapping engine 112 executing on the trusted service system 106 may determine whether the second device 100b is pointed in a direction of a location associated with the first device 100a. For example, the device location and/or orientation mapping engine 112 may compare location information associated with the first device 100a and the second device 100b and orientation information indicative of the direction the second device 100b is pointed to determine that the second device 100b is pointed in the direction of the first device 100a.

After determining that the second device 100b is oriented towards a location of the first device 100a, the service system 106 may communicate the message 502 from the second device 100b to the first device 100a. In some embodiments, prior to communicating the message 502 to the first device 100a, the service system 106 may determine whether first device 100a has communicated applicable policy information 506 to the service system 106. If applicable policy information 506 is identified, the identified policy information 506 may be enforced by a policy enforcement module 514 executing on the service system 106 in connection with communicating the message 502 to the first device 100*a*.

In certain embodiments, in connection with enforcing the policy information 506, the policy enforcement module 514 may determine whether the message 502, the second device 100*b*, and/or a user associated with the same is associated with and/or otherwise can demonstrate possession of a trusted credential 504 that may be used to securely authenticate an identity and/or a characteristic of the message 502, the second device 100*b*, and/or a user of the same. For example, the policy enforcement module 514 may verify that the message 502 is digitally signed by an authorized transmitting user and/or device. In another example, the policy enforcement module 514 may verify that the message 502 is associated with a trusted credential 504 that attests to the contents of the message 502 and/or the second device 100*b* meeting certain security requirements. In various embodiments, the policy enforcement module 514 may interact with a credential verification module 510 in connection with verifying and/or otherwise authenticating received trusted credentials 504.

In certain embodiments, the service system 106 may interact with one or more third-party services 512 in connection with enforcing policy information 506 and/or authenticating trusted credentials 504. For example, the service system 106 may interact with one or more credentialing and/or other trusted authorities to determine whether a trusted credential 504 associated with a message 502, a device (e.g., the second device 100*b*), and/or an associated user is authentic and/or associated with identifying information. In another example, the service system 106 may interact with a social networking and/or other contact management service to determine whether a user and/or device identified by a trusted credential 504 associated with a message 502 is included in a user's contact list, within a certain degree of connectedness, a member of one or more groups and/or organizations, and/or the like. It will be appreciated the service system 106 may interact with a variety of third party services 512 in connection with service orchestration, credential verification, policy enforcement, and/or other aspects of the embodiments disclosed herein.

If the policy enforcement module 514 determines that the message 502 from the second device 100*b* may be communicated to the first device 100*a* in accordance with applicable policy 506, the service orchestration module 114 executing on the service system 106 may communicate the message 502 to the first device 100*a*. In some embodiments, one or more policy enforcement actions may be performed by the policy enforcement module 514 prior to communicating the message 502 to the first device 100*a*. For example, the message 502 may be transformed in a specified manner (e.g., reformatted), nefarious code may be removed from the message 502, code may be added to the message, and/or the like. A policy enforced message 508 generated by the policy enforcement module 514 may then be communicated from the service system 106 to the first device 100*a*. A user of the first device 100*a* may then view the message 502 and/or the policy enforced message 508 using a suitable application executing on the first device 100*a* (e.g., the messaging application 500*a* and/or the like). In this manner, the service system 106 may act as a trusted intermediary in connection with the communication of the message 502 between the first device 100*a* and the second device 100*b*.

It will be appreciated that a number of variations can be made to the architecture, relationships, and examples presented in connection with FIG. 5 within the scope of the inventive body of work. For example, certain device and/or system functionalities described above may be integrated into a single device and/or system and/or any suitable combination of devices and/or systems in any suitable configuration. In further embodiments, one or more policies may be defined by a device communicating a message to the trusted service system for delivery to another device relating to, for example, one or more restrictions, conditions, and/or requirements that relate to an identity of a receiving device and/or a user thereof. Thus it will be appreciated that the architecture, relationships, and examples presented in connection with FIG. 5 are provided for purposes of illustration and explanation, and not limitation.

Figure 6:
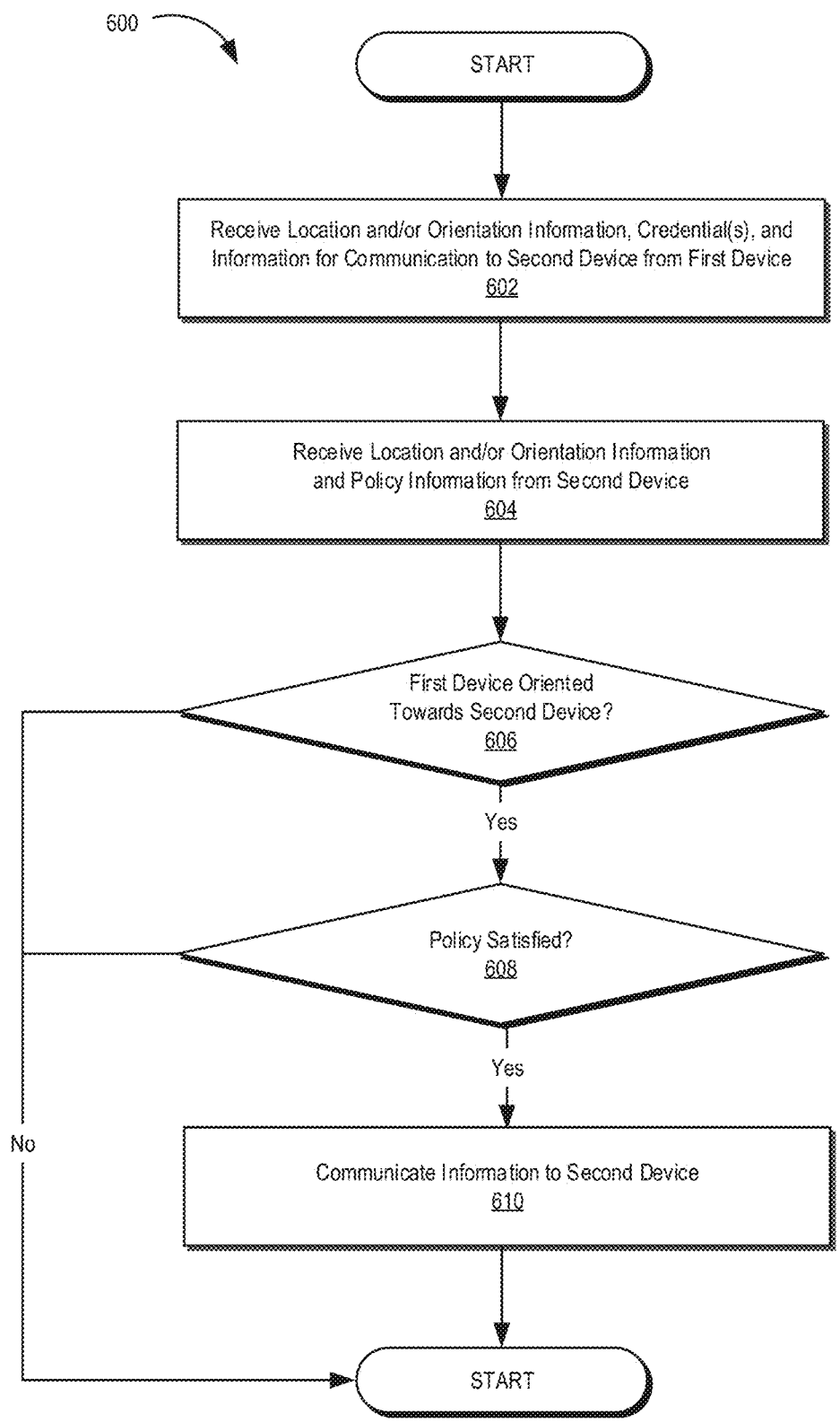
FIG. 6 illustrates a flow chart of an exemplary method for delivering messages between devices using a trusted service system consistent with certain embodiments of the present disclosure.

FIG. 6 illustrates an example of a flow chart of an exemplary method 600 for delivering messages between devices using a trusted service system consistent with certain embodiments of the present disclosure. The illustrated method 600 may be implemented in a variety of ways, including using software, firmware, hardware, and/or any combination thereof. In certain embodiments, various aspects of the method 600 and/or its constituent steps may be performed by a trusted service system, one or more devices, third-party systems, and/or any other suitable system or combination of systems. In certain embodiments, the illustrated method 600 may facilitate the trusted communication of messages between devices in accordance with articulated policy using a service system acting as a trusted intermediary.

At 602, first information may be received from a first device for communication to a second device. Information associated with the location and orientation of the first device and at least one trusted credential may be further received from the first device. The information associated with the location and orientation of the first device may comprise one or more a latitude, a longitude, an altitude, a location in an x-y-z coordinate space associated with a location of the first device, and/or a direction in which the first device is pointed and/or otherwise oriented. The information may be generated by a variety of suitable sensors and/or other systems associated with the first device including, without limitation, a global positioning system, an accelerometer system, a gyroscope system, and/or a digital compass.

The trusted credential(s) received from the first device may comprise any suitable type of trusted credential including, for example, a digital signature, a cryptographic key, and/or a digital certificate. In certain embodiments, the trusted credential(s) may uniquely identify the first device, a user of the first device, a characteristic of the first information, a characteristic of the first device (e.g., a hardware and/or software characteristic), and/or the like.

Second location information associated with a location of the second device may be received from the second device at 604. In some embodiments, the second location information may comprise one or more of a latitude, a longitude, an altitude, a location in an x-y-z coordinate space associated with a location of the second device, and/or the like, and may be generated by a variety of suitable systems including, for example, a global positioning system. In further embodiments, orientation information associated with an orientation of the second device may also be received from the second device.

Policy information articulating at least one requirement relating to the communication of information to the second device may be further received from the second device at 604. The policy information may articulate requirements relating to, for example, an identity of a user of the first device, a characteristic of the first device, the contents of the first information, conditions that the first information be securely associated with a trusted credential, conditions that the first information be transformed prior to transmission to the second device, requirements that the first information be analyzed prior to transmission to the second device, and/or the like.

At 606, it may be determined that the first device is oriented towards and/or otherwise pointed in a direction of the second device based on the received first location information, first orientation information, and second location information. In further embodiments, the determination at 606 may be further based on second orientation information received from the second device relating to an orientation of the second device.

If it is determined that the first device is oriented towards and/or otherwise pointed in a direction of the second device, the method 600 may proceed to 608, where the requirements of the policy information provided by the second device may be enforced in connection with communicating the first information to the second device. For example, the trusted credential received from the first device at 602 may be analyzed to determine whether the accompanying first information is permitted to be communicated to the second device. In another example, the first information may be transformed in accordance with requirements articulated in the policy information. If permitted by applicable enforced policy, the first information and/or associated policy-managed transformed information may be communicated to the second device at 610.

Figure 7:
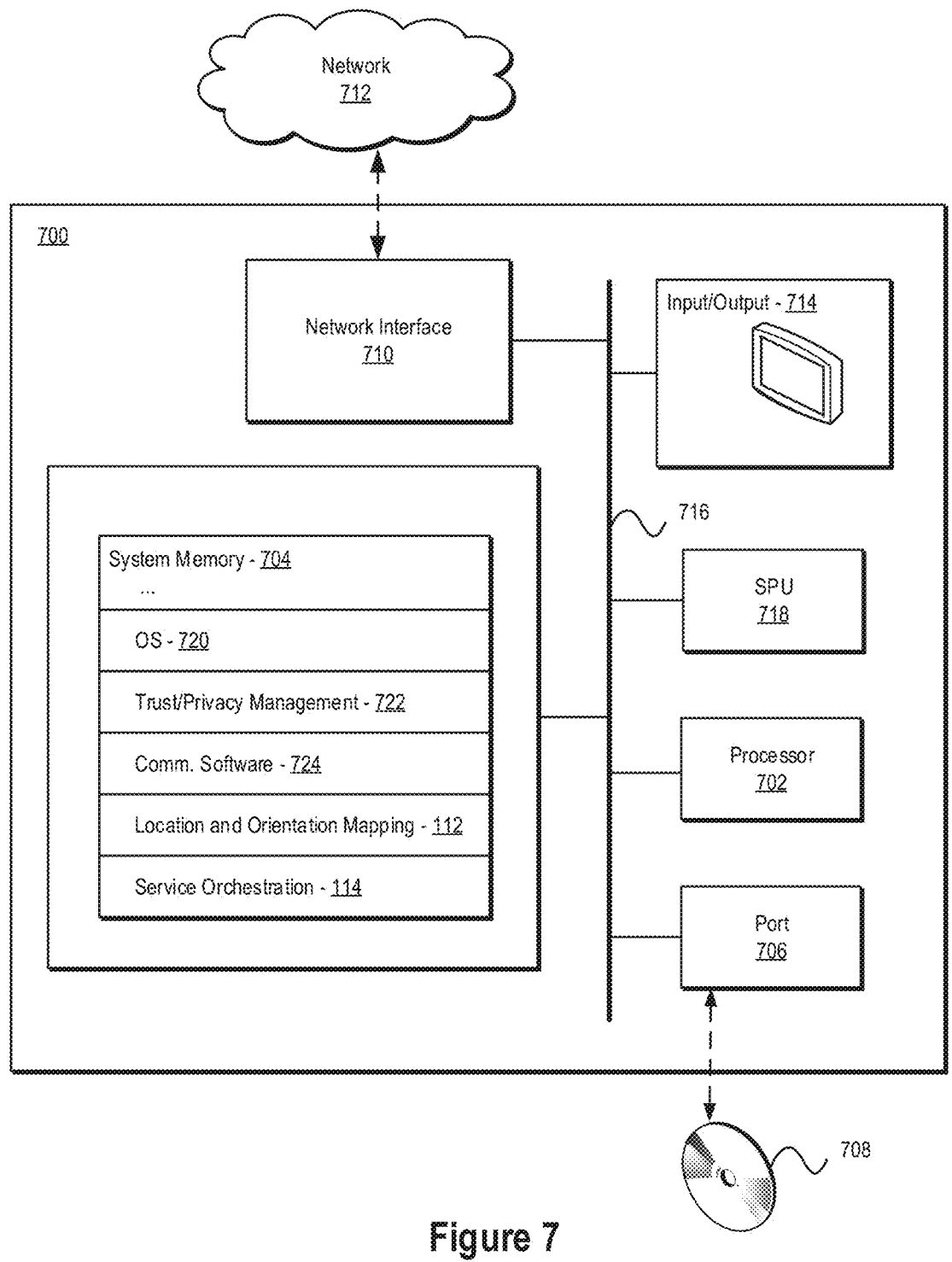
FIG. 7 illustrates an exemplary system that may be used to implement various embodiments of the systems and methods of the present disclosure.

FIG. 7 illustrates an exemplary system 700 that may be used to implement embodiments of the systems and methods of the present disclosure. Certain elements associated with the illustrated exemplary system 700 may be included in a mobile device, a service system, and/or any other system or service configured to implement aspects of the embodiments of the systems and methods disclosed herein. As illustrated in FIG. 7, the system may include: a processing unit 702; system memory 704, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 702; a port 706 for interfacing with removable memory 708 that may include one or more diskettes, optical storage mediums, and/or other non-transitory computer-readable storage mediums (e.g., flash memory, thumb drives, USB dongles, compact discs, DVDs, etc.); a network interface 710 for communicating with other systems via one or more network connections 712 using one or more communication technologies; a user interface 714 that may include a display and/or one or more input/output devices such as, for example, a touchscreen, a keyboard, a mouse, a track pad, and the like; and one or more busses 716 for communicatively coupling the elements of the system 700. In certain embodiments, the system 700 may further include and/or be associated with one or more sensors configured to collect various information including contextual user and/or device information. Such sensors may comprise, without limitation, audio sensors, video and/or image sensors, location sensors, orientation sensors, and/or any other types of sensors disclosed herein.

In some embodiments, the system 700 may, alternatively or in addition, include an SPU 718 that is protected from tampering by a user of the system or other entities by utilizing secure physical and/or virtual security techniques. An SPU 718 can help enhance the security of sensitive operations such as personal information management, trusted credential and/or key management, privacy and policy management, and other aspects of the systems and methods disclosed herein. In certain embodiments, the SPU 718 may operate in a logically secure processing domain and be configured to protect and operate on secret information, as described herein. In some embodiments, the SPU 718 may include internal memory storing executable instructions or programs configured to enable the SPU 718 to perform secure operations, as described herein.

The operation of the system may be generally controlled by a processing unit 702 and/or an SPU 718 operating by executing software instructions and programs stored in the system memory 704 (and/or other computer-readable media, such as removable memory). The system memory 704 may store a variety of executable programs or modules for controlling the operation of the system. For example, the system memory 704 may include an operating system ("OS") 720 that may manage and coordinate, at least in part, system hardware resources and provide for common services for execution of various applications and a trust and privacy management system 722 for implementing trust and privacy management functionality including protection and/or management of data through management and/or enforcement of associated policies.

The system memory 704 may further include, without limitation, communication software 724 configured to enable in part communication with and by the system; one or more applications; device location and/or orientation information generated by one or more mobile devices; a device location and orientation mapping engine 112 configured to determine, for example, a relative location and/or orientation between a plurality of mobile devices, and/or a service orchestration engine 114 for managing the delivery or services between devices and/or coordinating the function of various aspects of the disclosed systems and methods; and/or any other information and/or applications configured to implement embodiments of the systems and methods disclosed herein.

The systems and methods disclosed herein are not inherently related to any particular computer, device, service, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for managing trusted communications performed by a service system comprising a processor and a non-transitory computer-readable medium storing instructions that, when executed by the processor, cause the service system to perform the method, the method comprising:
   receiving, by the service system from a first device, data for communication from the first device, first location information associated with a location of the first device, first orientation information associated with an orientation of the first device, and a trusted credential;
   receiving, by the service system, second location information associated with a location of a second device;
   identifying that the second device is an intended recipient device based on the first location information, the first orientation information, and a determined relative distance between the first device and the second device;
   determining using, at least in part, the trusted credential, that at least one requirement relating to communication of information to the intended recipient device articulated in policy information has been satisfied; and
   transmitting, from the service system, in response to determining that the at least one requirement has been satisfied, the data to the second device.

2. The method of claim 1, wherein identifying that the second device is the intended recipient device comprises determining that the first orientation information is within an orientation precision window relative to the second location information associated with the location of the second device, the orientation precision window being determined based, at least in part, on the determined relative distance between the first device and the second device.

3. The method of claim 2, wherein the determined relative distance between the first device and the second device is determined based on the first location information and the second location information.

4. The method of claim 1, wherein the first location information comprises a latitude, a longitude, and an altitude associated with the location of the first device.

5. The method of claim 1, wherein the first location information comprises a location in an x-y-z coordinate space associated with the location of the first device.

6. The method of claim 1, wherein the second location information comprises a latitude, a longitude, and an altitude associated with the location of the second device.

7. The method of claim 1, wherein the second location information comprises a location in an x-y-z coordinate space associated with the location of the second device.

8. The method of claim 1, wherein the first location information comprises information generated by a global positioning system associated with the first device.

9. The method of claim 1, wherein the second location information comprises information generated by a global positioning system associated with the second device.

10. The method of claim 1, wherein the first orientation information comprises information generated by at least one of an accelerometer system, a gyroscope system, and a digital compass.

11. The method of claim 1, wherein the method further comprises receiving, by the service system from the second device, the policy information.

12. The method of claim 11, wherein the policy information comprises information associated with a user profile of a user of the second device.

13. The method of claim 1, wherein identifying that the second device is the intended recipient device comprises determining that the first device is oriented in a direction pointed towards the second device.

14. The method of claim 13, wherein the method further comprises:
   receiving, by the service system from the second device, second orientation information associated with an orientation of the second device; and
   wherein determining that the first device is oriented in a direction pointing towards the second device is further based on the second orientation information.

15. The method of claim 1, wherein the trusted credential comprises at least one of a digital signature, a cryptographic key, and a digital certificate.

16. The method of claim 1, wherein the trusted credential comprises at least one of a credential uniquely identifying a user of the first device, a credential uniquely identifying the first device, a credential identifying a characteristic of the user of the first device, a credential identifying a characteristic of the data, a credential identifying a hardware characteristic of the first device, and a credential identifying a software characteristic of the first device.

17. The method of claim 1, wherein the at least one requirement comprises at least one requirement relating to an identity of a user of the first device.

18. The method of claim 1, wherein the at least one requirement comprises at least one requirement relating to a characteristic of a user of the first device.

19. The method of claim 1, wherein the at least one requirement comprises at least one requirement relating to a characteristic of the first device.

20. The method of claim 1, wherein the at least one requirement comprises at least one requirement relating to contents of the data.

* * * * *